United States Patent
Wolf et al.

(10) Patent No.: US 10,022,881 B2
(45) Date of Patent: Jul. 17, 2018

(54) CUTTING TOOL WITH BLADE AND HANDLE OPENING CONTROL MECHANISM

(71) Applicant: Corona Clipper, Inc., Corona, CA (US)

(72) Inventors: James Joseph Wolf, Waconia, MN (US); Craig Steven Agney, Minneapolis, MN (US); Estevan Jose Silvas, Jr., Corona, CA (US); Timothy Edward Atnip, Temecula, CA (US); Christopher S. Daniels, Columbus, OH (US); Jeffrey R. Burger, Bexley, OH (US); Laura W. Alexander, Sunbury, OH (US); Donald C. Meves, Columbus, OH (US); Anthony Magana, Riverside, CA (US)

(73) Assignee: CORONA CLIPPER, INC., Corona, CA (US)

( * ) Notice: Subject to any disclaimer, the term of this patent is extended or adjusted under 35 U.S.C. 154(b) by 92 days.

(21) Appl. No.: 15/240,917

(22) Filed: Aug. 18, 2016

(65) Prior Publication Data
US 2018/0050457 A1 Feb. 22, 2018

(51) Int. Cl.
*B26B 13/00* (2006.01)
*B26B 13/28* (2006.01)
*A01G 3/02* (2006.01)

(52) U.S. Cl.
CPC ............... *B26B 13/28* (2013.01); *A01G 3/02* (2013.01)

(58) Field of Classification Search
CPC .................................. B26B 13/28; A01G 3/02

USPC ........................................... 30/261-262, 254
See application file for complete search history.

(56) References Cited

U.S. PATENT DOCUMENTS

| | | | | |
|---|---|---|---|---|
| 2,528,128 A * | 10/1950 | Forster | ..................... | B25F 1/00 254/26 R |
| 4,073,059 A * | 2/1978 | Wallace | ................... | A01G 3/02 30/261 |
| 4,074,430 A * | 2/1978 | Sugiyama | ............... | B26B 13/28 30/260 |
| 5,345,636 A * | 9/1994 | Lamons | .................. | B25B 13/10 7/107 |
| 6,725,547 B2 * | 4/2004 | Wu | .......................... | A01G 3/02 30/254 |
| 7,178,245 B1 * | 2/2007 | Lee | .......................... | A01G 3/02 30/254 |
| 7,516,550 B2 * | 4/2009 | Hagan | .................... | B23D 51/01 30/162 |
| 8,079,150 B2 * | 12/2011 | Huang | ................... | B26B 13/16 30/254 |
| 8,549,757 B2 * | 10/2013 | Wu | ......................... | B26B 13/16 30/194 |

(Continued)

FOREIGN PATENT DOCUMENTS

DE 19652389 A1 * 3/1998 ............... A01G 3/02
DE 202012102455 12/2012
FR 3002112 A1 * 8/2014 ............. A01G 3/021

*Primary Examiner* — Ghassem Alie
*Assistant Examiner* — Bharat C Patel (57) ABSTRACT

A bypass pruning tool with a manual dial adjustment for varying the degree of blade and handle opening. A rotary drum dial uses a nautilus cam with a shaft cam-follower to provide adjustment of the blade and handle openings in a continuous range. A blade locking mechanism provides position closure of the blades.

9 Claims, 9 Drawing Sheets

(56) References Cited

U.S. PATENT DOCUMENTS

| | | |
|---|---|---|
| 9,003,667 B2 | 4/2015 | Huang |
| 9,144,201 B2 * | 9/2015 | Vanttila .................... A01G 3/02 |
| 2006/0191142 A1 * | 8/2006 | Jou ......................... A01G 3/02 30/262 |
| 2007/0266568 A1 * | 11/2007 | Lin ......................... A01G 3/02 30/134 |
| 2014/0202007 A1 * | 7/2014 | Huang .................... A01G 3/02 30/262 |

* cited by examiner

CUTTING TOOL WITH BLADE AND HANDLE OPENING CONTROL MECHANISM

BACKGROUND OF THE INVENTION

1. Field of the Invention

The present invention relates generally to improvements in cutting tools and more particularly pertains to new and improved hand operated tools for pruning vegetation.

2. Description of Related Art

Hand operated cutting tools that have a first and second cutting element and handles, that operate like a pair of scissors, with the blades bypassing each other, for cutting vegetation, are widely used. These bypass pruning tools utilize a spring between the handles so that the handles are pressed together against the force of the spring. When the handles are released, the force of the spring causes the blades and handles to open to a maximum opening angle. Adjustment mechanisms for such bypass cutting tools have been devised to allow the user to adjust the maximum opening angle of the handle and the blades. Most of these adjustment mechanisms are not compact, requiring significant space on the cutting tool. The design of these mechanisms usually require a complicated arrangement of gears and levers.

The present invention overcomes the complexity and size limitation of prior art adjustment mechanisms.

SUMMARY OF THE INVENTION

A bypass cutting tool having a manual dial adjustment for varying the degree of blade and handle opening to accommodate the hands of a user. A rotary drum dial uses a nautilus cam with a shaft cam follower to allow adjustment on a continuous range of blade and handle openings.

BRIEF DESCRIPTION OF THE DRAWINGS

Many of the attendant advantages of this invention will be readily appreciated as the same becomes better understood by reference to the following detailed description considered in conjunction with the accompanying drawings in which like reference numerals designate like parts throughout the figures thereof and wherein.

DETAILED DESCRIPTION OF THE PREFERRED EMBODIMENTS

The opening control mechanism of the present invention is illustrated in connection with a bypass pruner 11 shown in FIGS. 1 and 2, although it may be utilized on other hand operated cutting tools as well. The bypass lopper 11 of FIGS. 1 and 2 has a blade 15 attached to a handle 13 and a hook 19 attached to a handle 17. The two blades rotate about a pivot axis 20. A spiral spring 21 attached to the handles is biased to move the handles 13 and 17 apart. The distance that the blades 15 and 19 are opened by the spring 21 is controlled by an opening control mechanism 23 mounted to the handles of the bypass pruner 11.

Figure 1:
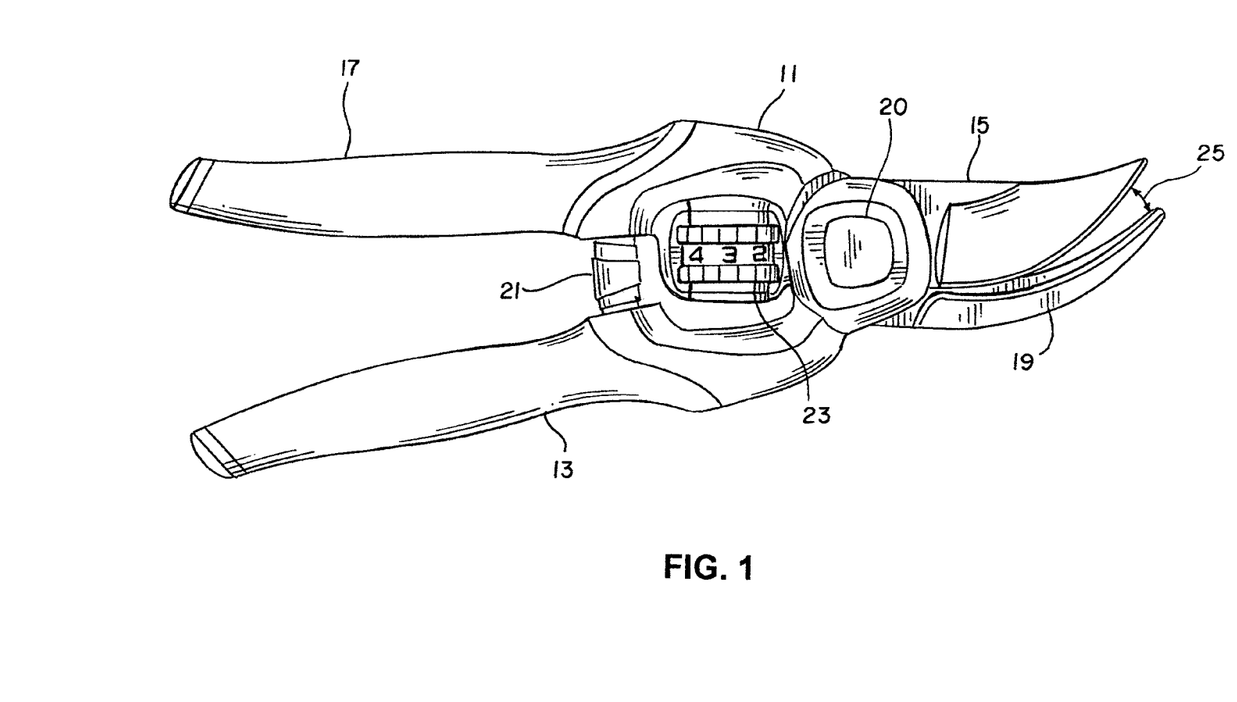
FIG. 1 is a side perspective of a preferred embodiment of the invention at a minimum opening.
Figure 2:
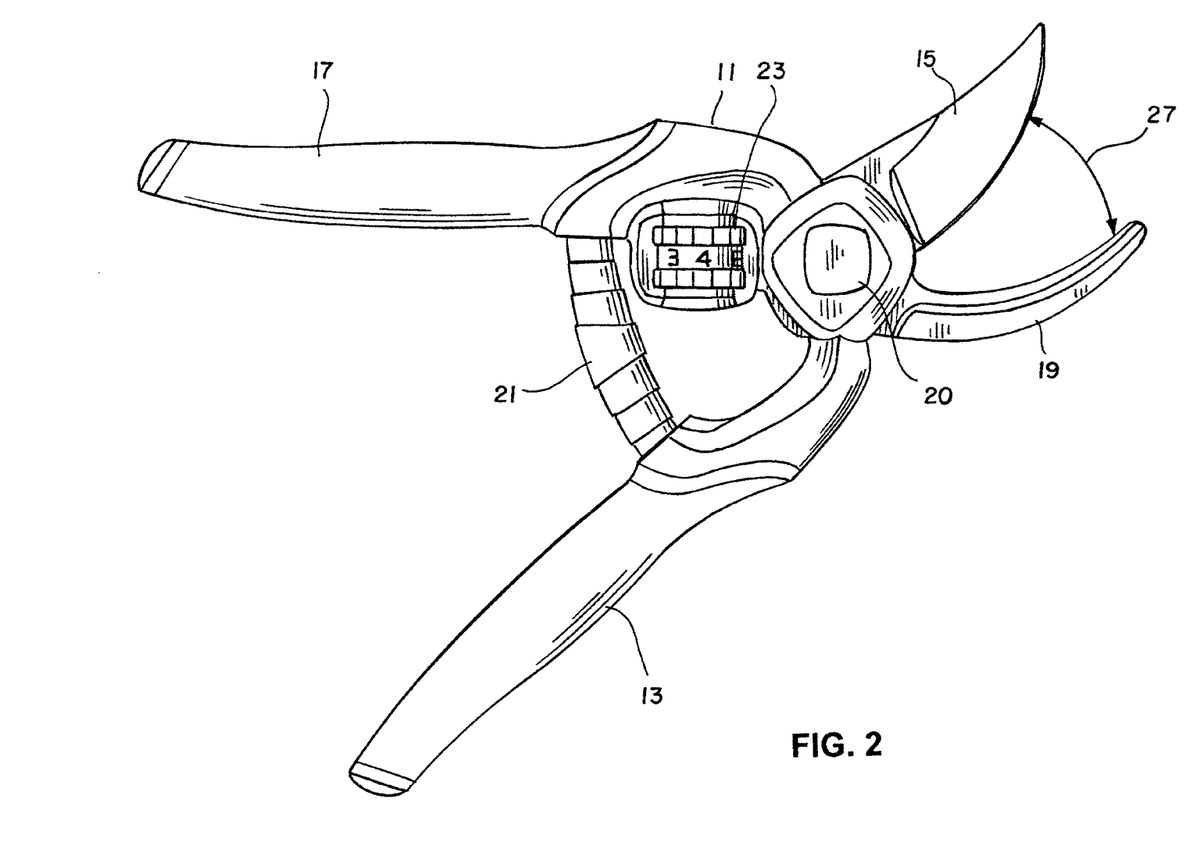
FIG. 2 is a side perspective of a preferred embodiment of the invention at a maximum opening.

FIG. 1 illustrates the bypass pruner 11 with the opening control mechanism 23 adjusted to provide a minimal opening 25 of the blades 15 and 19 and the handles 13 and 17. FIG. 2 illustrates the opening control mechanism 23 adjusted to allow for maximum opening 27 of the blades 15 and 19 and the handles 17 and 13. An opening control mechanism 23 in the form of a drum dial is adjustable over a range of openings by rotating the drum dial.

Figure 3:
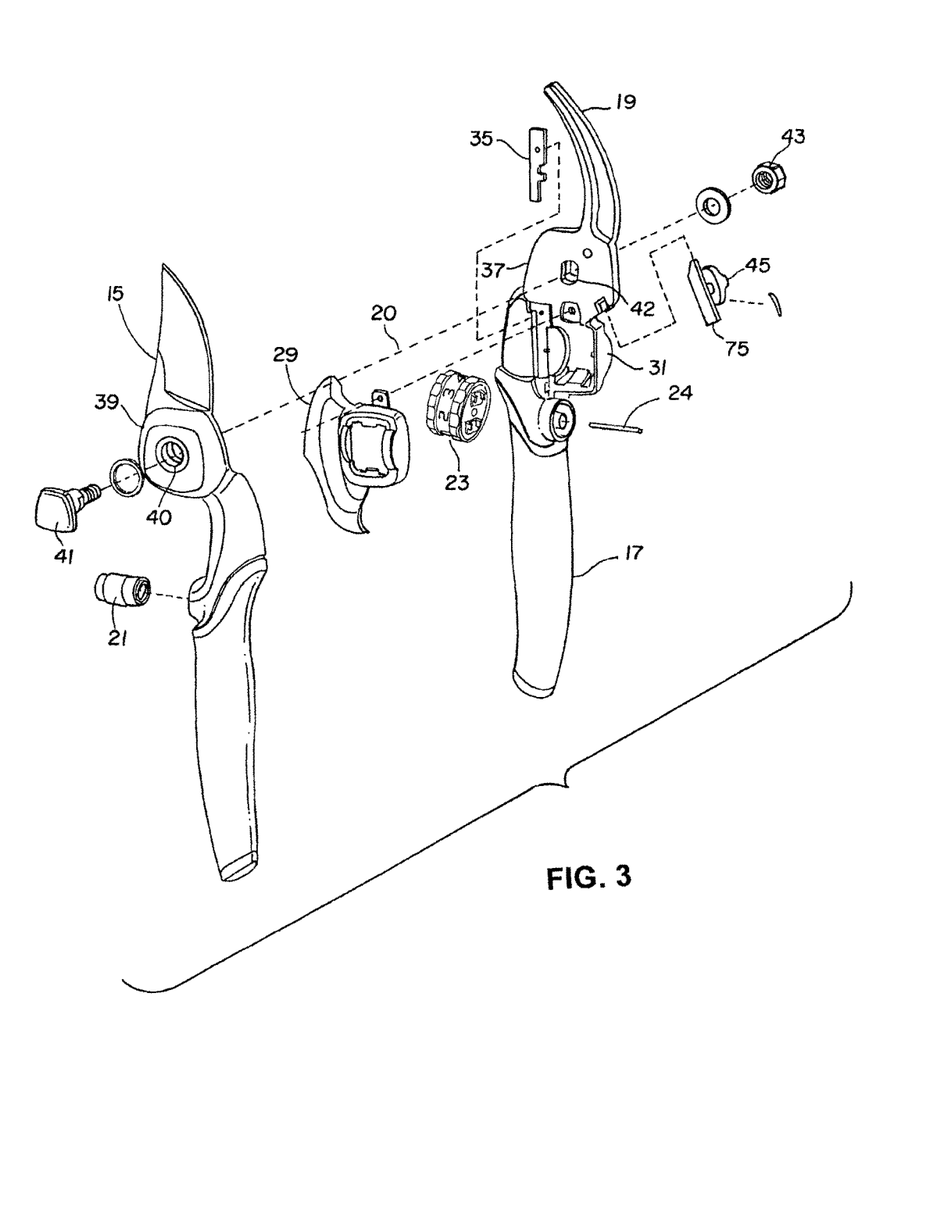
FIG. 3 is an assembly drawing of the preferred embodiment of the invention.

FIG. 3 is an assembly drawing that illustrates the major components of the opening control mechanism as associated with a cutting blade 15 and a hook blade 19. Cutting blade 15 is attached to a handle 13 by way of a blade pivot head 39. Hook blade 19 is attached to handle 17 by way of a hook pivot head 37 which complements the shape of blade pivot head 39. Blade pivot head 39 has an aperture 40 which aligns with aperture 42 in hook pivot head 37. A pivot bolt 41 passes through apertures 40 and 42 and is fastened on the other side of hook pivot head 37 by a nut 43. The blades 15 and 19 rotate about the shaft of bolt 41. The spring mechanism 21 is attached to complementary positions on the handles 13 and 17.

A frame 31 attached to the hook blade assembly below its hook pivot head 37 receives the drum dial control mechanism 23 which will rotate about its rotary shaft 24 fastened within the frame 31. A cover 29 fits over the drum dial control mechanism 23 once it is placed within frame 31 to hold it in place, in a manner that will withstand the environmental impacts the tool normally experiences in use. A cam follower 35 attaches to a cam (not shown) in a manner which will be explained hereinafter, to be activated by the cam in the drum dial control mechanism 23 to control the degree of opening of blades 15 and 19.

Figure 4:
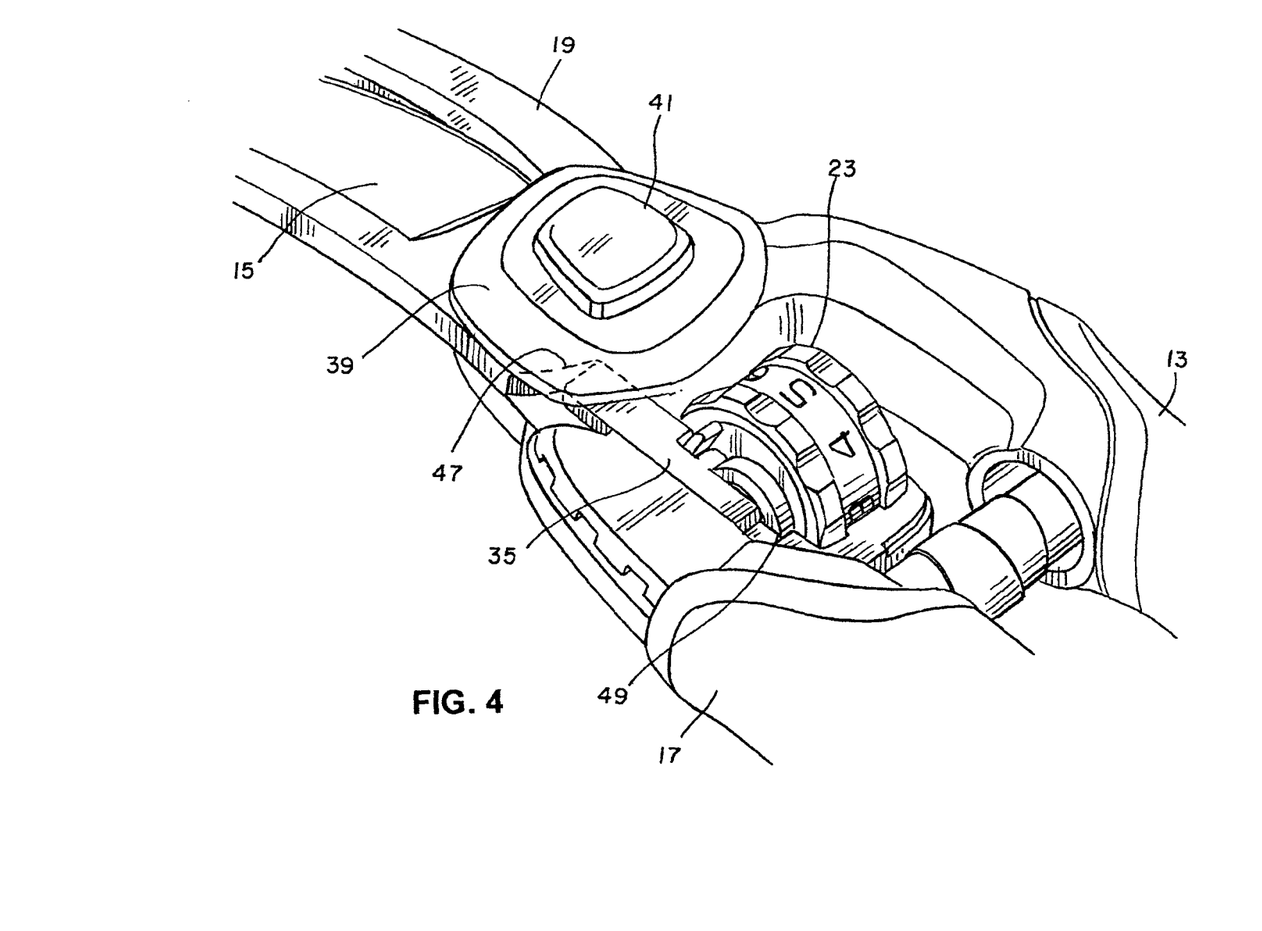
FIG. 4 is a magnified perspective of the opening adjustment mechanism at a minimum opening.
Figure 5:
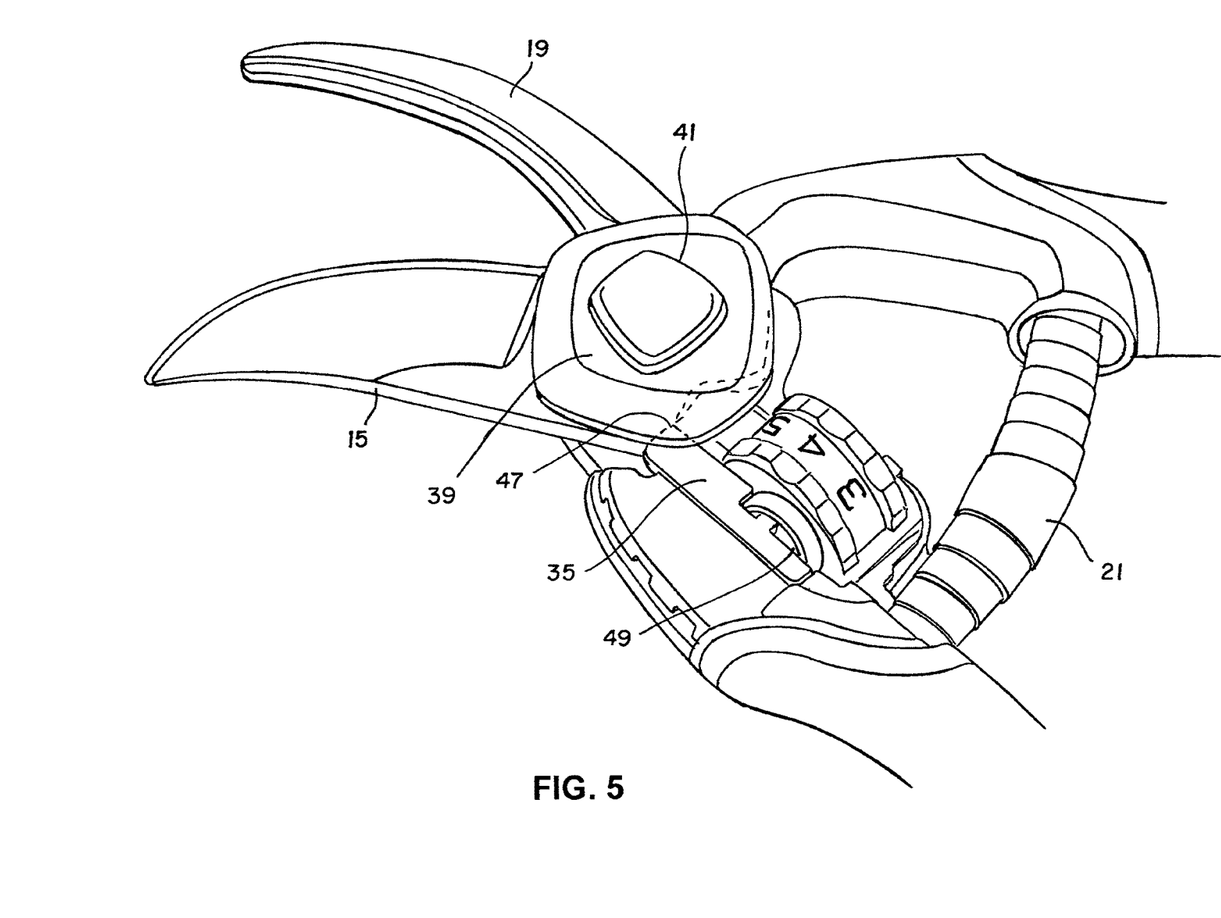
FIG. 5 is a magnified perspective of the opening adjustment mechanism at a maximum opening.

FIGS. 4 and 5 illustrate interaction between the cam follower 35 and a nautilus cam 49 attached to the drum dial control mechanism 23 and a cam follower travel ridge 47, formed into the blade head 39. FIGS. 4 and 5 show the position of the cam follower 35 in association with the nautilus cam 49. The position of the cam follower 35 and its interaction with the follower travel ridge 47 on the blade head 49 illustrated in FIG. 4 shows the minimum opening setting for the control mechanism 23. FIG. 5 shows the positions of the cam follower 35 and the follower travel ridge 47 for the maximum opening.

Figure 6:
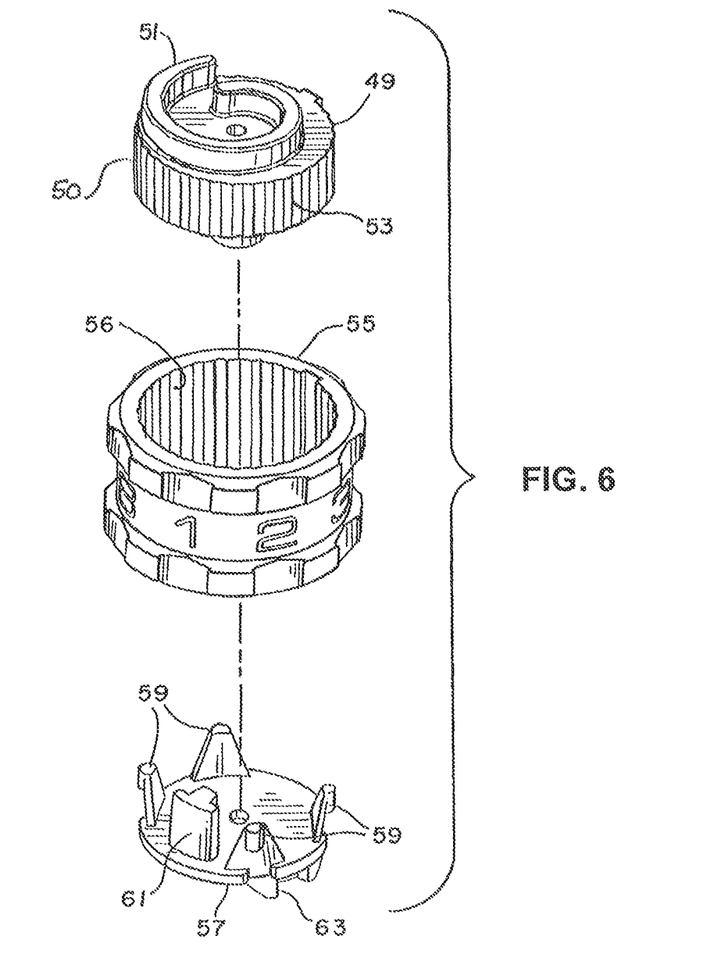
FIG. 6 is an exploded assembly of the opening adjustment mechanism used in the preferred embodiment.

Referring now to FIG. 6, the drum dial control mechanism 23 is shown as having three major components. A drum dial 55 with a grooved interior 56 and numerical markings on its exterior. Fitting within the drum dial is a nautilus cam 49 which has a spiral cam surface 51 mounted on one end of a cylinder 50. A plurality of ridges 53 are formed on the outside surface of the cam cylinder 50. These ridges engage with the grooves 56 on the inside of the drum dial 55. The result being that the cam 49 rotates in unison with rotation of drum dial 55.

A hub 57 fits into the interior of drum dial 55 at the other end of the drum dial. It is fixedly attached to the frame 31 below the hook rotating head 37 of the hook blade 19 (FIG. 3) by aims 63. The hub 57 has fingers 59 that interact with the grooves 56 in the interior of the hub dial 55, thereby providing a detent feedback when the drum dial 55 is rotated. The hub 57 also has a stop ridge 61 which interacts with a stop 62 (FIG. 10) on the cam 49.

Figure 7:
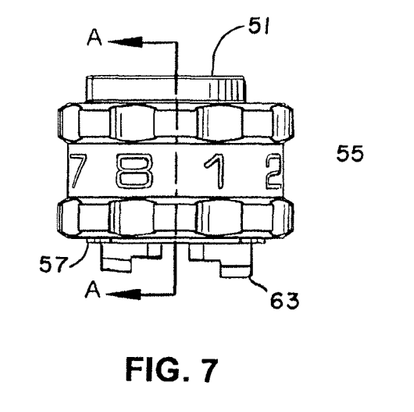
FIG. 7 is a plan front view of the opening adjustment mechanism.
Figure 8:
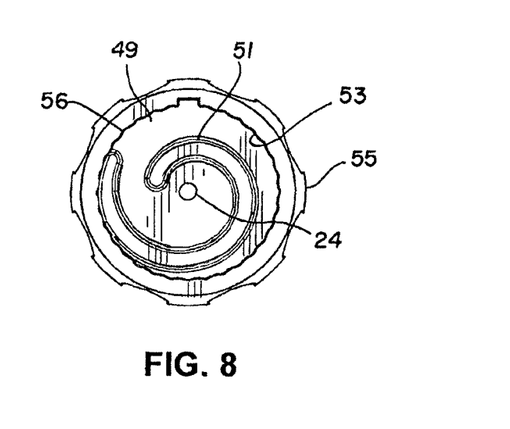
FIG. 8 is a plan top view of the opening adjustment mechanism.

FIGS. 7, 8, 9 and 10 illustrate the structure of the drum control mechanism 23 in more detail. FIG. 7 is a front plan view of the drum control mechanism which shows the nautilus cam surface 51 mounted in drum dial 23 at one end and the hub 57 mounted in drum dial 23 at the other end. FIG. 8 shows a top view of the cam 49 as mounted in the of drum dial 55 with the ridges 53 on cam 49 aligning with and locking into the grooves 56 in the interior of drum dial 55. Rotation of drum dial 55 will rotate the cam 49 causing the nautilus cam surface 51 to rotate around its axis of rotation 24.

Figure 9:
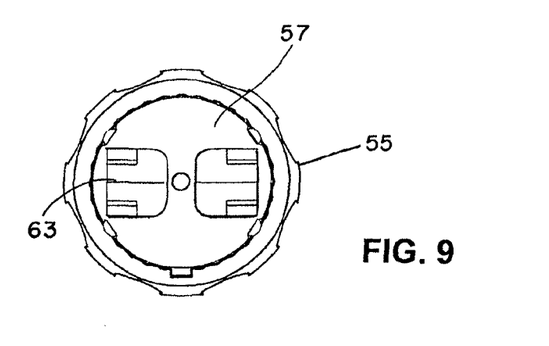
FIG. 9 is a plan bottom view of the opening adjustment mechanism.

FIG. 9 shows the bottom view of the hub 57 mounted in the interior of drum dial 55 to rotate with drum dial 55. Arms 63 on the hub 57 attach to the frame 31 on hook blade 19.

Figure 10:
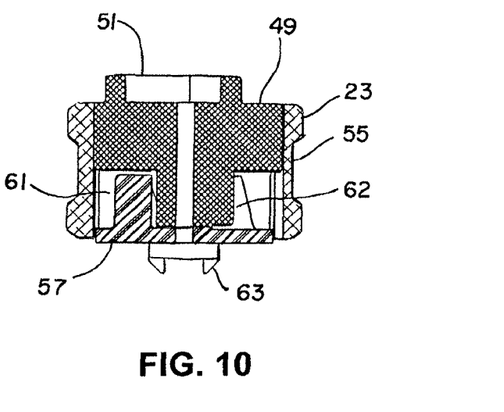
FIG. 10 is a cross section opening adjustment mechanism of FIG. 7 taken along line A-A.

FIG. 10 is a cross section of the drum dial control mechanism 23 taken along lines AA of FIG. 7. The cross section shows the cam 49 with its nautilus cam surface 51 at one end of the cylinder body connected to the interior of drum dial 55. At the opposite end, the hub 57 has attachment arms 63 which attach to the frame 31 (FIG. 3) of the hook blade assembly. The hub 57 rotates freely within the drum dial 55. The stop ridge 61 on the hub 57 interacts with a stop 62 on the cylinder end of the cam 49. These two stops define the minimum and maximum opening of the blades.

Figure 11:
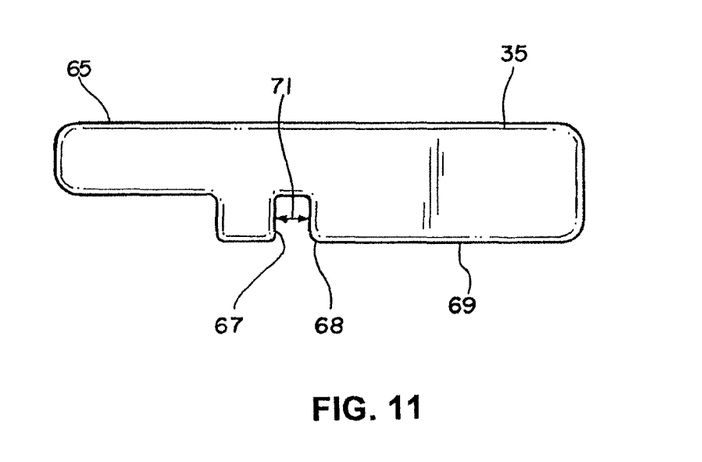
FIG. 11 is a plan side view of the cam follower of the present invention.

FIG. 11 shows a preferred cam follower 35. Cam follower 35 has a forward section 69 and a rearward section 65 with a groove 71 formed into the forward section 69 to create a leading wall 68 and a trailing wall 67. The groove 71 is sized to receive the nautilus cam surface ridge 51 (FIG. 8). As a result of the rotation of cam 49 about its axis of rotation 24, the cam follower 35 will move laterally forward or backward tracking the spiral cam surface ridge 51, depending on the direction of rotation of the drum dial. The position of minimum and maximum blade opening illustrated in FIGS. 4 and 5 also show the location of the cam follower 35 at these openings. At these positions the maximum opening position cam follower 35 is in a rearward position, thereby allowing the blade 15 to open to its maximum opening. In the minimum opening position the cam follower 35, as shown in FIG. 4, is at its most forward position, thereby preventing blade 15 from opening any further than indicated.

Figure 12:
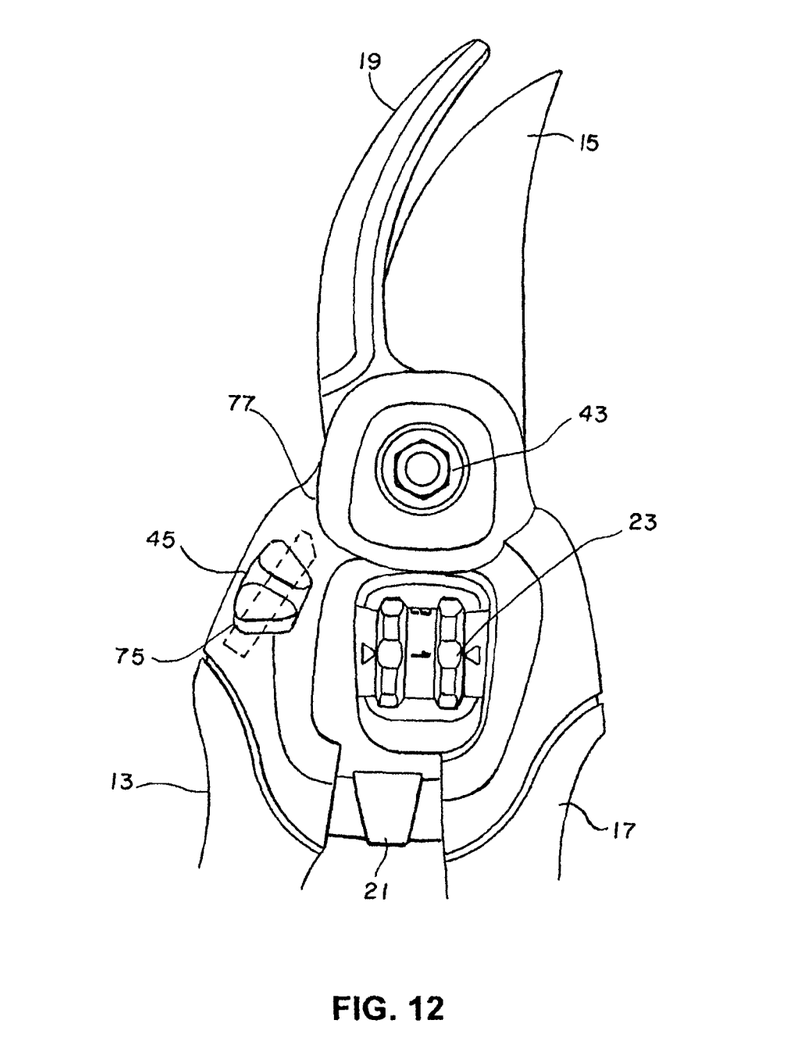
FIG. 12 is a magnified perspective of the opening adjusting mechanism and locking mechanism of the preferred embodiment.

The cutting tool of the preferred embodiment also has a blade lock 45 as shown in FIG. 12. The blade lock 45 has a shaft 75 riding in a groove on the handle 13 of the cutting blade 15. As the knob of the blade lock 45 is moved forward, the shaft 75, and specifically its leading edge 79 moves into an aperture 77 in the hook blade rotation head 37, thereby preventing rotation of the cutting blade 15 with respect to the hook 19.

Figure 13:
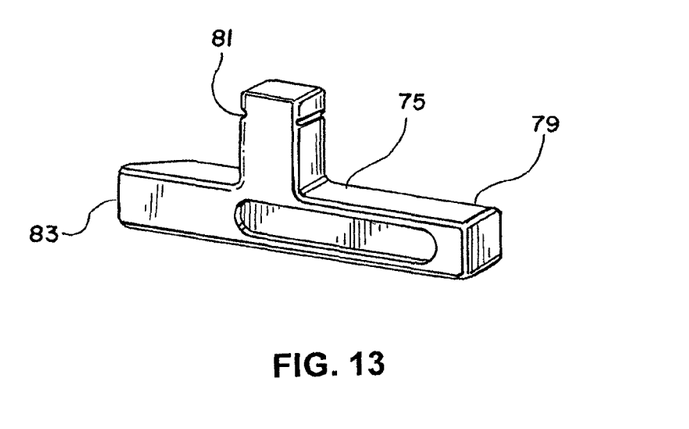
FIG. 13 is a side perspective of the locking shaft used in the locking mechanism of FIG. 12.

FIG. 13 illustrates the locking shaft 75 preferably as a "T" structure have an upstanding arm 81 which attaches to the blade lock knob 45 and a shaft with a leading end 79 and trailing end 83.

What is claimed is:

1. A cutting tool with a blade and handle opening control mechanism, comprising:
    a first blade attached to a first handle, with an axis of rotation between the first blade and the first handle, a travel ridge on the first blade adjacent to the first axis of rotation;
    a second blade attached to a second handle, with an axis of rotation between the second blade and the second handle, the second blade rotatably joined to the first blade at the first axis of rotation;
    a drum dial located on the second blade with an axis of rotation perpendicular to the axis of rotation of the first and second blades, the drum dial having an interior surface with grooves parallel to the drum dial axis of rotation;
    a cam cylinder having a nautilus cam surface on one end of the cylinder and ridges on the outside surface of the cylinder sized to mate with the grooves on the interior surface of the drum dial, the cam cylinder located in the drum dial for rotation with the drum dial; and
    a cam follower engaging the nautilus cam surface on the cam cylinder, and riding on the travel ridge on the first blade.

2. The cutting tool of claim 1 further comprising:
    a hub located in the interior of the drum dial, the hub having detent fingers engaging the grooves in the interior surface of the drum dial, whereby rotation of the drum dial moves the detent fingers from one groove to another and rotates the nautilus cam surface.

3. The cutting tool of claim 1 wherein the drum dial has setting markings on an outside surface, each setting mark corresponding with a certain open angle of the first and second blade.

4. The cutting tool of claim 1 further comprising a blade lock shaft on the first handle adjacent to the axis of rotation, the second blade having a blade pivot head at the axis of rotation with a cavity in the blade pivot head aligned with the blade lock shaft when the first and second blades are closed, whereby sliding the blade lock shaft into the cavity of the blade pivot head cavity prevents the blades from rotating with respect to each other.

5. The cutting tool of claim 1 further comprising a spiral spring fastened to the first handle and second handle below the drum dial, whereby the spring tends to move the blades and the handles apart.

6. The cutting tool of claim 1 wherein the first and second blades are bypass cutting blades.

7. The cutting tool of claim 4 further comprising a knob on the blade lock shaft for moving the shaft into and out of the cavity on the blade pivot head.

8. The cutting tool of claim 3 wherein the setting markings on the drum dial are Arabic numbers.

9. The cutting tool of claim 8 further comprising a stop mechanism in the drum dial for preventing the drum dial from rotating beyond the lowest and highest number markings.

* * * * *